United States Patent [19]

Williamson

[11] Patent Number: 4,977,352

[45] Date of Patent: Dec. 11, 1990

[54] PLASMA GENERATOR HAVING RF DRIVEN CATHODE

[75] Inventor: Weldon S. Williamson, Malibu, Calif.

[73] Assignee: Hughes Aircraft Company, Los Angeles, Calif.

[21] Appl. No.: 211,497

[22] Filed: Jun. 24, 1988

[51] Int. Cl.[5] .............................................. H05H 1/24
[52] U.S. Cl. ........................... 315/111.81; 315/111.41; 315/111.21; 250/433 R; 250/427; 250/431; 313/231.31
[58] Field of Search ....................... 315/111.81, 111.41, 315/111.21; 250/423 R, 427, 431; 313/231.31

[56] References Cited

U.S. PATENT DOCUMENTS

| | | | |
|---|---|---|---|
| 3,515,932 | 6/1970 | King | 313/339 |
| 3,610,985 | 10/1971 | Fleming et al. | 313/63 |
| 4,481,062 | 11/1984 | Kaufman et al. | 156/345 |
| 4,642,522 | 2/1987 | Harvey et al. | 315/111.81 X |
| 4,777,370 | 10/1988 | Pigache et al. | 250/427 X |
| 4,778,561 | 10/1988 | Ghanbari | 250/423 R X |
| 4,810,935 | 3/1989 | Boswell | 315/111.41 |
| 4,841,197 | 6/1989 | Takayama et al. | 315/111.81 |
| 4,859,908 | 8/1989 | Yoshida et al. | 315/111.81 |

OTHER PUBLICATIONS

1986 American Institute of Physics, "High-Power Radio-Frequency Plasma Source", C. Craig Petty et al, pp. 2409–2414.

K. Tokiguchi et al, "Beam Extraction Experiments from Microwave Ion Sources", Review of Sci. Instrum., vol. 57 (8), Aug. 1986, pp. 1526–1530.

D. P. Grubb et al, "Conical Slow Wave Antenna as a Plasma Source", Review of Sci. Instrum., vol. 49 (1), Jan. 1978, pp. 77–79.

M. Matsuoka et al, "Low Energy Ion Extraction with Small Dispersion from an Electron Cyclotron Resonance Microwave Plasma Stream", Applied Physics Letters, vol. 50 (26), Jun. 29, 1987, pp. 1864–1865.

S. Nakanishi, "Parallel Plate R.F. Ion Thruster", AIAA/JSASS/DGLR 16th International Electric Propulsion Conference, Nov. 17, 19, 1982.

C. Lejeune et al, "RF Multipolar Plasma for Broad and Reactive Ion Beams", Vacuum, vol. 36, Nos. 11/12, 1986, pp. 837–840.

Primary Examiner—Eugene R. LaRoche
Assistant Examiner—Do Hyun Yoo
Attorney, Agent, or Firm—V. D. Duraiswamy; P. M. Coble; W. K. Denson-Low

[57] ABSTRACT

A plasma generator 10 which includes an rf driven cathode 40 capable of using reactive gases and having a cathode housing 54. A gas feed system 20 introduces gas into an antechamber 42 defined by the cathode housing 54. An electric field is generated within the antechamber 42 by an antenna 46. A grid 50 mounted within the antechamber 42 defines first R1 and second R2 regions therein, a first region R1 between the antenna 46 and the grid 50, and a second region R2. The grid 50 confines the electric field generated by the antenna 46 to the first region R1 of the antechamber 42 to induce a discharge of electrons from the gas therein. The grid 50 further allows at least a portion of the discharged electrons to migrate to the second region R2 to ionize the gas therein into a cathode plasma 60. In one embodiment, the plasma 60 is then induced to flow into a discharge chamber 70 defined by an anode shell 72. A plurality of magnets 74, 76 and 78 adjust the motion of electrons within the discharge chamber 70 thereby further increasing the efficiency with which the cathode plasma 60 is converted into a more highly ionized discharge plasma 82.

17 Claims, 2 Drawing Sheets

PLASMA GENERATOR HAVING RF DRIVEN CATHODE

BACKGROUND OF THE INVENTION

1. Field of the Invention:

The present invention relates to plasma sources. More specifically, the present invention relates to low energy plasma sources.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Conventional plasma sources can be broadly grouped on the basis of the mode in which a discharge of electrons into a gas is effected to form a plasma. In particular, plasma sources characterized by a dc (Penning) electron discharge typically include an element for thermionically emitting a supply of ionizing electrons. Alternatively, other plasma sources effect electron discharge through application of relatively high-voltage radio frequency (rf) electric fields to the gas.

Penning-type sources generally include either a filamentary cathode or a "hollow" cathode for achieving thermionic electron emission. Hollow cathodes include a chamber containing an insert having a coating of electron emissive material. The emissive material, when heated, furnishes the desired supply of ionizing electrons. Similarly, thermionic electron emission may also be achieved by passing a current of sufficient magnitude through a filamentary wire. Following electron emission a plasma is formed in Penning-type sources by accelerating the emitted electrons through the gas by way of a suitably biased anode. Ionization efficiency is enhanced by gyrating the path of the accelerated electrons with a magnetic field.

However, plasma sources operative through Penning discharges facilitated by electrons from filamentary cathodes are unsuitable for certain long term applications. Specifically, with prolonged usage such filamentary cathodes predictably burn out. Consequently such filamentary cathodes are unacceptable for utilization in, for example, spacecraft applications wherein replacement of the cathode is not possible.

Similarly, hollow cathodes used in Penning-type sources are not implementable in many plasma sources fueled by reactive gasses. Reactive gasses such as oxygen are desirable plasma fuels in applications such as plasma cleaning of optical surfaces. For example, optical surfaces included within a spacecraft may become contaminated with molecular films due to the outgassing of organic substances in the vicinity of the optical elements. These elements may be cleaned by allowing the plasma generated from the reactive gas to react with contaminants present on the optical surface. Under appropriate conditions the energy of reaction between these contaminants and the cleaning plasma is sufficient such that reaction products containing the contaminants are liberated from the optical surface. However, the electron emissive material which coats the hollow cathode is often incompatible with such reactive gasses. Hence, conventional plasma sources employing hollow cathodes and Penning discharges are not suitable for cleaning applications involving reactive gasses.

As mentioned above, other plasma sources effect plasma formation by ionizing a gas through application of a sufficiently large rf electric field. These "rf-only" sources may be fed by reactive gas mixtures and do not require a supply of thermionically generated electrons. However, rf-only sources are typically inefficient in comparison with Penning-type sources. That is, rf-only sources dissipate more energy per ion produced than do Penning-type sources. This inefficiency stems in part from the high voltages necessary for adequate ionization of a gaseous fuel and makes rf-only sources less attractive in spacecraft applications where available power is limited. Further, these high rf voltages also produce sputtering of metal atoms within the discharge chamber in which ionization occurs. These sputtered metal atoms have a high probability of becoming ionized and consequently becoming plasma contaminants. In addition, plasmas generated by rf-only sources are typically of relatively high energy. High energy plasmas are unsuitable for use in applications such as optical cleaning as the energetic ions included therein tend to roughen sensitive optical surfaces thereby degrading performance.

Hence, a need in the art exists for a low energy, long lifetime plasma source which includes a cathode capable of utilizing reactive gases.

SUMMARY OF THE INVENTION

The need in the art for providing a low energy, long lifetime plasma source which includes a cathode capable of utilizing reactive gases is addressed by the plasma generator of the present invention. An rf driven cathode included within the present invention includes a cathode housing for defining an antechamber having a longitudinal axis. A gas feed system in communication with the antechamber introduces a gas therein. An alternating electric field is generated within the antechamber by an antenna. A grid mounted within the antechamber defines first and second regions therein, the first region being between the antenna and the grid and the second region defined on at least one side by the grid. The grid confines the electric field generated by the antenna to the first region of the antechamber to induce a discharge of the electrons from the gas included therein. The grid further allows at least a portion of the discharged electrons to pass in a direction transverse to the longitudinal axis of the antechamber to the second region to at least partially ionize the gas therein. In the specific application of a plasma generator, the partially ionized gas provided by the rf driven cathode is then induced to flow into a discharge chamber defined by an anode shell. The anode shell creates an electric field which accelerates electrons from the partially ionized gas. A plurality of magnets adjust the motion of electrons within the discharge chamber thereby further increasing the efficiency with which the partially ionized gas is converted into a more highly ionized plasma.

DETAILED DESCRIPTION OF THE INVENTION

Figure 1:
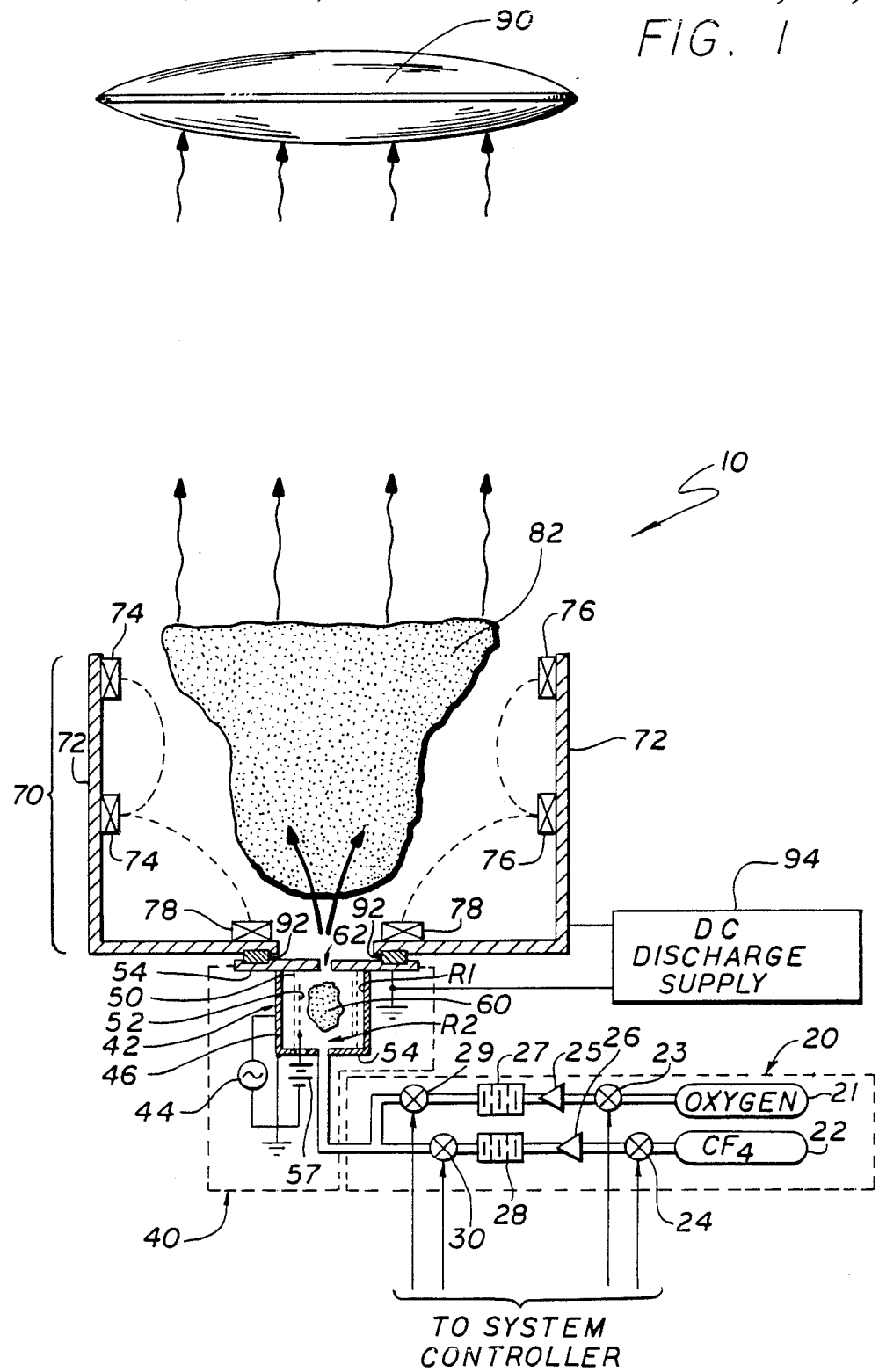
FIG. 1 is illustrative embodiment of the plasma generator of the present invention, showing the cathode and discharge chambers in section and the electrical and gas feed systems in schematic views.

FIG. 1 is illustrative embodiment of the plasma generator 10 of the present invention, showing an rf driven cathode 40 and discharge chamber 70 in section and a gas feed system 20 and electrical circuitry in schematic views. The gas feed system 20 included within the plasma generator 10 supplies a gas mixture to an rf driven cathode 40. As will be described more fully below, the gas mixture fills an antechamber 42 included within the cathode 40. The plasma generator 10 is operative to partially ionize the gas within the antechamber 42 to form a cathode plasma 60. The plasma 60 is then induced to flow into the discharge chamber 70 by virtue of the lower gas pressure therein. The cathode plasma 60 is further ionized within the discharge chamber 70 to create a discharge plasma 82.

As shown in the preferred embodiment of FIG. 1, the gas feed system 20 includes a pair of gas bottles 21 and 22 which contain oxygen and tetrafluromethane, respectively. The bottles 21 and 22 are sealed at several thousand psi by a pair of conventional high pressure squib valves 23 and 24. In a spacecraft environment the bottles 21 and 22 remain sealed until the valves 23 and 24 are opened with small explosive charges. The valves 23 and 24 are connected to a system controller (not shown) which triggers t he charges at a desired instant. A pair of conventional pressure regulators 25 and 26 reduce the gas flow pressure from the bottles 21 and 22 to generally between 10 and 20 psi.

Coupled to the outputs of the regulators 25 and 26 are a pair of gas flow impedances 27 and 28. The gas flow impedances 27 and 28 operate under the fixed pressure provided by the pressure regulators 25 and 26 and adjust the flow rate of the gas dispensed therefrom. Each of the gas flow impedances 27 and 28 include a number of series-connected gas flow impedance elements. In this manner the number of elements included within each of the gas flow impedances 27 and 28 is adjusted to achieve the desired gas flow rate into the antechamber 42. The gas flow impedances 27 and 28 may be assembled from Viscojet gas flow impedance elements manufactured by the Lee Company.

The relative proportions of oxygen and tetrafluromethane present in the gas mixture supplied to the antechamber 42 by the gas feed system 20 are determined by the gas flow impedances 27 and 28 in conjunction with a pair of conventional low pressure valves 29 and 30. The valves 29 and 30 are both typically turned fully on or off by the system controller. The specific composition of the gas mixture furnished by the feed system 20 will vary with respect to the particular application for which the generator 10 is employed.

As shown in FIG. 1, the antenna 46 and a multi-piece metallic cathode housing 54 bound the antechamber 42. The cathode housing 54 is grounded while the antenna 46 is driven by the rf source 44. The antenna 46 generates a radially directed electric field within the antechamber 42 to prevent rf excited electrons from penetrating the discharge chamber 70. The antenna 46 is of conventional design and is anchored to the housing 54 with suitably insulating material. The frequency of the rf source 44 is chosen to optimize electron discharge from the gas mixture introduced into the antechamber 42 by the gas feed system 20. In general, this frequency is chosen to be as large as is permissible given that the wavelength of the generated rf energy should not approach the dimensions of the antechamber 42. When such a sufficient reduction in wavelength occurs, undesirable localized variations in the magnitude of the electron discharge from the gas within the antechamber 42 are induced. As an example, for gas mixtures having a large oxygen component an rf source 44 having a frequency of 150 MHz has been used.

The first cylindrical grid 50 is at ground potential by virtue of being connected to the cathode housing 54. The first grid 50 serves to confine the electric field created by the antenna 46 within the annular discharge region R1. The second cylindrical grid 52 is held at a positive dc potential by the source 57. The second grid 52 may be secured to the housing 54 by electrically insulated support members (not shown). The combination of the first and second grids 50 and 52 allows electrons discharged from the gas within the region R1 to flow transversely into the ionization region R2 and partially ionize the gas therein. Further, the grids 50 and 52 substantially prevent communication between ions within the regions R1 and R2. Such communication can induce undesirable variations in the potential of the cathode plasma 60 included within the region R2.

The rf driven cathode apparatus 40 is mechanically coupled to, and electrically isolated from, the anode shell 72 by insulating plates 92. The anode shell 72 is made of metal, or other suitably conducting material, and mechanically supports magnetic rings 74, 76 and 78. The magnets 74, 76 and 78 may be fabricated from samarium-cobalt or other suitably magnetic material. A dc discharge power supply 94 coupled to the anode shell 72 holds the anode shell at a desired dc potential. In this manner the power supply 94 enables the anode shell 72 to generate an electric field within the discharge chamber 70. Similarly, as is illustratively represented in FIG. 1 the magnets 74, 76 and 78 create a magnetic field within the discharge chamber 70.

In operation, the rf source 44 impresses an alternating voltage upon the cylindrical rf antenna 46 which circumscribes the antechamber 42. The antenna 46 creates a radially directed, alternating electric field within an annular discharge region R1 included within the antechamber 42. The discharge region R1 is bounded by the cylindrical antenna 46 and the first electrically conductive wire grid 50. The electric field created by the antenna 46 is constrained to remain within the region R1 as the first grid 50 is coupled to a cathode housing 54 which is connected to ground.

At least two methods are available for starting (igniting) the initial plasma discharge within the discharge region R1 of the antechamber 42. For example in a conventional approach a pulse of high voltage (e.g. 10 kV) is applied by a dc supply (not shown) between the antenna 46 and ground after the gas mixture has been introduced into the antechamber 42. The rf source 44 is activated prior to application of the pulse and includes protective circuitry to prevent damage bY the dc supply. After the initial breakdown of the gas within the antechamber 42 the plasma discharge is sustained by the alternating electric field within the discharge region R1. However conventional high voltage ignition is disadvantageous, particularly in spacecraft applications, as a result of the added weight and complexity of the additional power supply and because of the electrical noise and arc-breakdown hazards associated therewith. Alternatively, commonly assigned U.S. Pat. Application Ser. No. 922,582 filed Oct. 24, 1986 and issued on U.S. Pat. No. 4,800,281, on Jan. 24, 1989 in the name of Weldon S. Williamson and entitled COMPACT PENNING-DISCHARGE PLASMA SOURCE, discloses a "gas burst" plasma ignition method. Specifically, this method is implemented within the generator 10 of the present invention by initially closing the valves 29 and 30 to allow gas at the pressure of the regulators 25 and 26 to accumulate between the valves 29 and 30 and the respective flow impedances 27 and 28. The rf source 44 is then activated and the valves 29 and 30 are abruptly opened simultaneously. This produces a transient flow of high-pressure gas into the discharge region R1. At this high pressure, Paschen breakdown of the gas occurs within the region R1 notwithstanding the comparatively low voltages generated by the rf source 44. In this manner the initial plasma discharge may be effected within the antechamber 42 without reliance on a high voltage dc power supply.

The electrons discharged from the gas within the region R1 pass in a direction transverse to the longitudinal axis of the antechamber 42 through the first grid 50 and through the second electrically conductive wire grid 52 biased by the voltage source 57 to an ionization region R2 included within the antechamber 42. The gas mixture included within the region R2 is partially ionized by these discharged electrons to form the cathode plasma 60. The cathode plasma 60 then flows from the antechamber 42 through an orifice 62 into the dc discharge chamber 70 by virtue of the lower gas pressure therein. The chamber 70 is defined by the cylindrically shaped, electrically conductive anode shell 72 having an open end. The pair of magnetic rings 74 and 76 are attached to the lateral interior surface of the anode shell 72. The magnetic ring 78 is mounted on the floor of the anode shell 72 and is centered about the longitudinal axis thereof. As mentioned above, the electric and magnetic fields formed within the chamber 70 by the anode shell 72 and the magnets 74, 76 and 78 serve to accelerate electrons within the chamber 70 in a helical pattern thereby further ionizing the cathode plasma 60 into a discharge plasma 82. The plasma 82 then drifts from the plasma generator 10 and may be used to, for example, clean the surface of an optical element 90. In the embodiment of FIG. the discharge plasma 82 includes electrons and $C^+$, $O^+$, and $F^+$ ions created from the oxygen/tetrafluoromethane gas mixture. Hence, in the embodiment of FIG. 1 the plasma generator 10 of the present invention is operative to provide a plasma 82 from a mixture of reactive gases.

As was mentioned in the Background of the Invention, conventional Penning-type plasma sources are typically unable to generate a plasma from a reactive gas mixture, without resorting to life-shortening techniques. In addition, although conventional rf-only plasma sources are capable of using reactive gas mixtures, the relatively large rf voltages employed lead to the generation of highly energetic plasmas. In contrast, the voltage sources 44 and 94 included within the plasma generator 10 may be adjusted to provide a plasma 82 of a desired energy. It is therefore a feature of the present invention that a potentially low energy plasma may be created from a mixture of reactive gases.

Figure 2:
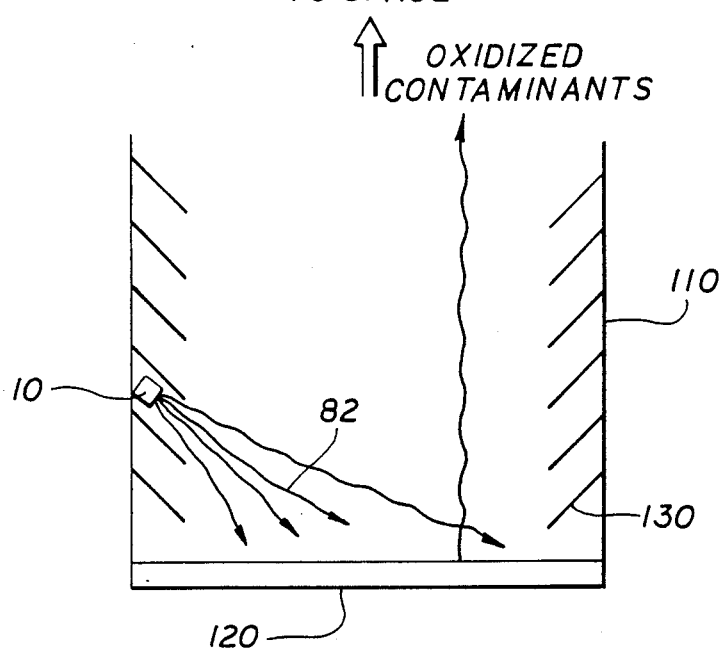
FIG. 2 shows the plasma generator of the present invention in a first illustrative application.

FIG. 2 shows the plasma generator 10 of the present invention in a first illustrative application. As shown in FIG. 2, the plasma generator 10 of the present invention is mounted within a baffle tube 110. The tube 110 is secured to a spacecraft (not shown) and defines the field of view of an optical element 120. The element 120 may be a component of an optical instrument (e.g. a telescope) mounted on the spacecraft. The tube 110 includes a plurality of cooled baffles 130 for limiting the amount of stray optical radiation illuminating the element 120. In the embodiment of FIG. the baffle tube 110, the baffles 130 and the optical element 120 are cooled to cryogenic temperatures. The plasma generator 10 emits the discharge plasma 82 in the direction of the optical element 120. The ions included within the plasma 82 chemically react with contaminants present on the surface of the optical element 120 upon contact therewith. The products of this reaction, including the contaminants oxidized by the plasma 82, are then released from the surface of the optical element 120 and drift into space. In this manner the plasma generator 10 of the present invention may be utilized to effect cleaning of an optical element 120.

Figure 3:
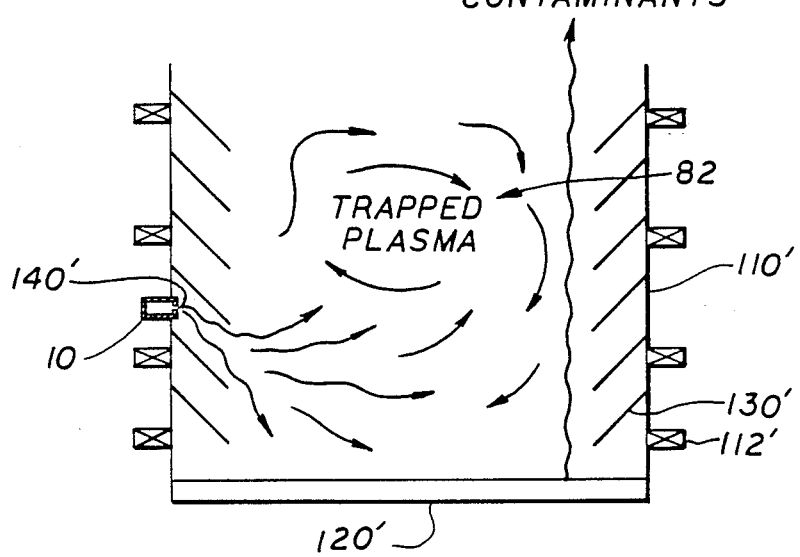
FIG. 3 shows the plasma generator of the present invention in a second illustrative application in which the plasma produced thereby is trapped with the aid of a magnetic field.

FIG. 3 shows the plasma generator 10 of the present invention in a second illustrative application in which the plasma 82 produced thereby is trapped with the aid of a magnetic field. Included in FIG. 3 is an improved baffle tube 110, having a plurality of magnet rings 112' attached thereto. Again, the tube 110, serves to define the field of view of an optical element 120, and to limit the incidence of stray optical radiation thereupon. The baffle tube 110,, baffles 130,, optical element 120, and externally positioned plasma generator 10 shown in FIG. 3 are substantially identical to the tube 110, baffles 130, optical element 120 and generator 10 of FIG. 2. However, in the configuration of FIG. 3 the generator 10 injects the plasma 82 into the tube 110, through an aperture 140, The magnet rings 112, circumscribing the tube 110' create a magnetic field therein which traps the plasma 82 within the cylindrical volume defined by the lateral surface and the open end of tube 110, and by the optical element 120, That is, the magnetic field prevents electrons in the plasma 82 from drifting outside the tube 110, or from being absorbed by the surfaces thereof. As a consequence positive ions from the plasma 82 which drift away from the tube 110, create a net negative charge therein which allows the tube 110, to recapture these drifting ions. Further, the oxidized contaminants generated from the chemical reactions occurring on the surface of the optical element 120, are electrically neutral and are hence allowed to exit the tube 110' Thus, it is seen that the improved baffle tube 110' enhances the cleaning efficiency of the plasma 82 by allowing escape only of the electrically neutral contaminant reaction products.

Thus the present invention has been described with reference to a particular embodiment in connection with a particular application. Those having ordinary skill in the art and access to the teachings of the present invention will recognize additional modifications and applications within the scope thereof. For example, the rf driven cathode apparatus may include an rf antenna and wire grids having shapes other than cylinders. Similarly, the invention is not limited to the particular orientation disclosed herein of the wire grids within the antechamber. Those skilled in the art may be aware of other grid configurations which allow partial ionization of the gas within the antechamber. Additionally, anode shells of other suitable shapes and sizes may be appropriate for inclusion in alternative embodiments of the present invention. Further, gas mixtures suitable for applications other than optical cleaning may be substituted for the oxygen and tetrafluromethane reactive gas mixture disclosed herein without departing from the scope of the present invention.

With access to the teachings herein it will also be apparent to one skilled in the art to modify the plasma generator of the present invention to serve as an ion source. Such an ion source could be continuously operative as the need for replacement of a filamentary cathode is obviated. Terestrially, an ion source comprising a modification of the present invention would be useful in semiconductor processing while potential spacecraft applications include use of the ion source in plasma contactors and ion thrusters.

It is therefore contemplated by the appended claims to cover any and all such modifications.

Accordingly,

What is claimed is:

1. An rf driven cathode and gas feed system comprising:
   cathode housing means for defining an antechamber, said antechamber having a longitudinal axis;
   gas feed means in communication with said antechamber for introducing a gas therein;
   antenna means for generating an electric field within said antechamber;
   grid means, including a grid mounted within said antechamber defining first and second regions therein, said first region being between said antenna and said grid and said second region being defined at least on one side by said grid, for confining said electric field to said first region of said antechamber to induce a discharge of electrons from said gas within said first region and for allowing said discharged electrons to migrate in a direction transverse to said longitudinal axis to said second region of said antechamber to at least partially ionize said gas within said second region..

2. The rf driven, cathode of claim 1 wherein said antenna means includes a cylindrical antenna which circumscribes said antechamber.

3. The rf driven cathode of claim 2 wherein said grid means includes a first cylindrical electrically conductive grid disposed within said antechamber, said grid being electrically connected to said cathode housing means.

4. The rf driven cathode of claim 3 wherein said grid means further includes a second cylindrical electrically conductive grid disposed within said antechamber and means for applying a potential difference between said cathode housing means and said second grid.

5. The rf driven cathode of claim 4 wherein said second grid is circumscribed by said first grid.

6. The rf driven cathode of claim 5 wherein said gas feed means includes a gas reservoir and further includes valve means for controlling gas flow from said reservoir into said chamber.

7. A plasma generator comprising:
   cathode housing means for defining an antechamber, said antechamber having a longitudinal axis;
   gas feed means in communication with said antechamber for introducing a gas therein;
   antenna means for generating an electric field within said antechamber;
   grid means, including a grid mounted within said antechamber defining first and second regions therein, said first region being between said antenna and said grid and said second region being defined at least on one side by said grid, for confining said electric field to said first region of said antechamber to induce a discharge of electrons from said gas within said first region and for allowing said discharged electrons to migrate in a direction transverse to said longitudinal axis to said second region of said antechamber to at least partially ionize said gas within said second region;
   anode means for defining a discharge chamber in communication with said antechamber;
   means for inducing said partially ionized gas to flow into said discharge chamber; and
   magnet means for adjusting the motion of electrons within said discharge chamber to further ionize said partially ionized gas into a plasma.

8. The plasma generator of claim 7 wherein said antenna means includes a cylindrical antenna which circumscribes said chamber.

9. The plasma generator of claim 8 wherein said grid means includes a first cylindrical electrically conductive grid disposed within said antechamber, said grid being electrically connected to said cathode housing means.

10. The plasma generator of claim 9 wherein said qrid means further includes a second cylindrical electrically conductive grid disposed within said antechamber and means for applying a potential difference between said cathode housing means and said second grid.

11. The plasma generator of claim 10 wherein said anode means includes an electrically conductive shell which partially encloses said ionization chamber.

12. The plasma generator of claim 11 wherein said magnet means includes a plurality of magnets attached to said shell, said magnets being arranged to generate a magnetic field which substantially prevents said plasma from contacting said shell.

13. A plasma generator comprising:
   cathode housing means for defining an antechamber, said antechamber having a longitudinal axis;
   a gas reservoir;
   valve means in communication with said antechamber and said reservoir for controlling the flow of gas included within said reservoir into said chamber;
   a cylindrical antenna circumscribing said antechamber for generating an electric field within said antechamber;
   means for impressing a voltage upon said antenna;
   a first cylindrical electrically conductive grid disposed within said antechamber, said grid being electrically connected to said cathode housing means;
   a second cylindrical electrically conductive grid disposed within said antechamber;
   means for applying a potential difference between said cathode housing means and said second grid;
   an electrically conductive anode shell which partially encloses an ionization chamber, said shell defining an aperture which allows said ionization chamber to be in communication with said antechamber;
   means for applying a potential difference between said anode shell and said cathode housing means; and
   a plurality of magnets attached to said shell for generating a magnetic field within said discharge chamber.

14. A method of generating a plasma comprising the steps of:

(a) introducing a gas into a first chamber;
(b) generating an electric field within said first chamber;
(c) confining said electric field to within a first region of said chamber to induce a discharge of electrons from said gas within said first region of said chamber;
(d) injecting at least some of said discharged electrons to a second region of said chamber to at least partially ionize said gas within said second region;
(e) inducing said gas to flow into a second chamber in communication with said first chamber;
(f) adjusting the motion of said accelerated electrons within said second chamber to generate a plasma from said partially ionized gas included within said second chamber.

15. The method of claim 14 wherein said step of injecting at least some of said disCharged electrons to at least partially ionize said gas includes the step of directing said injected electrons to migrate to said second region in a direction transverse to the direction of the flow of said gas between said first and second chambers.

16. An rf driven cathode comprising:
cathode housing means for defining an antechamber for containing gas therein, said antechamber having a longitudinal axis;
antenna means for generating an electric field within said antechamber;
grid means, including a grid mounted within said antechamber defining first and second regions therein, said first region being between said antenna and said grid and said second region being defined at least on one side by said grid, for confining said electric field to said first region of said antechamber to induce a discharge of electrons from the gas within said first region and for allowing the discharged electrons to migrate in a direction transverse to said longitudinal axis to said second region of said antechamber to at least partially ionize the gas within said second region.

17. An apparatus for cleaning optical elements and removing contaminant reaction products therefrom, comprising:
(a) a plasma generator including:
a cathode housing for defining an antechamber, said antechamber having a longitudinal axis;
gas feed means in communication with said antechamber for introducing a gas therein;
antenna means for generating an electric field within said antechamber;
grid means, including a grid mounted within said antechamber defining first and second regions therein, said first region being between said antenna and said grid and said second region being defined at least on one side by said grid, for confining said electric field to said first region of said antechamber to induce a discharge of electrons from the gas within said first region and for allowing said discharged electrons to migrate in a direction transverse to said longitudinal axis to said second region of said antechamber to at least partially ionize the gas within said second region;
anode means for defining a discharge chamber in communication with said antechamber;
means for inducing the partially ionized gas to flow into said discharge chamber; and
magnet means for adjusting the motion of electrons within said discharge chamber to further ionize the partially ionized gas into a plasma; and
(b) a baffle tube into which said plasma generator injects the generated plasma, said baffle tube including:
a plurality of baffles within the tube and
a plurality of magnets for creating a magnetic field within said tube to trap the plasma within but allow electrically neutral contaminant reaction products to exit the tube.

* * * * *

UNITED STATES PATENT AND TRADEMARK OFFICE
CERTIFICATE OF CORRECTION

PATENT NO. : 4,977,352
DATED : DECEMBER 11, 1990
INVENTOR(S) : WELDON S. WILLIAMSON

It is certified that error appears in the above-identified patent and that said Letters Patent is hereby corrected as shown below:

Abstract, line 2, delete "using" and insert --utilizing--.

Col. 7, line 38, delete "." second occurrence.

Col. 9, line 19, delete "disCharged" and insert --discharged--.

Col. 10, line 36, after the word "tube", insert --,--.

Signed and Sealed this

Fifth Day of October, 1993

Attest:

BRUCE LEHMAN

Attesting Officer

Commissioner of Patents and Trademarks